Patented Nov. 2, 1926.

1,605,108

UNITED STATES PATENT OFFICE.

GEORGE GRINDROD, OF OCONOMOWOC, WISCONSIN, ASSIGNOR TO CARNATION MILK PRODUCTS COMPANY, OF OCONOMOWOC, WISCONSIN, A CORPORATION OF DELAWARE.

EDIBLE FAT AND PROCESS OF PRODUCING SAME.

No Drawing.   Application filed May 12, 1919. Serial No. 296,691.

Heretofore, in food products, vegetable fats have been substituted for animal fats to a greater or lesser extent. While it has been recognized that the vegetable fats contain certain injurious elements, such as toxins of vegetable origin that are not found in animal fats, no satisfactory method has been found, so far as is known, to entirely remove such constituents and produce a fat approaching, if not equaling animal fat in nutritive value, flavor and palatibility. Nor have such vegetable fats had the same assimilability as animal fats and such vegetable fats have been subject to the further objection that they have cumulative toxic effects due to their various vegetable toxin constituents.

One of the objects of my invention is to produce a vegetable fat product free from aldehydes, ketones and hydroxy fats, and free from toxic constituents and from compounds capable of producing toxic constituents.

A further object of the invention is to provide a process of eliminating the toxic substances from vegetable fats and also for eliminating the compounds capable of reforming them.

I have discovered that in vegetable fats, and more particularly in cocoanut fat, it is the aldehydes, ketones and hydroxy fats, as constituents of cocoanut fat, that produce toxic effects and reduce the assimilability of cocoanut fat and other vegetable fats. By the elimination of such toxic and undesirable substances from a natural vegetable fat, I have produced a product consisting of fractionally hydrogenated vegetable fat containing no aldehydes or ketones, oleic glyceride, having a melting point below 37½° C. and more stable than normal pure butter fat against rancidity-production by heat.

My product, as prepared from cocoanut oil, for instance, is characterized by a color paler in liquid state than ordinary edible cocoanut fat and is free from fatty acids to the extent of about twenty-five hundredths of one per cent (.25 of 1%) and is clearer than it. It has neither odor nor taste. When a solid my fat is entirely white. It is distinct from the edible cocoanut fat in that it does not develop any odor or taste when heated to 120° C. It solidifies with a fine grain. In solidifying it does not separate into oily or crystalline constituents as the ordinary edible cocoanut fat does. Chemically, the product has no reaction for aldehydes, ketones, hydroxy fats or other rancidity-producing compounds. It will withstand any given or specified temperature such as 120° C., or other given different conditions of temperature and humidity, without becoming rancid, for approximately ten times as long as the original purified edible cocoanut fat of commerce. The product is non-toxic when used as the only fat in a diet and is as readily assimilable as butter fat, in this respect being distinct from the purest cocoanut fat heretofore prepared. The product is stable. It has no constituents which are capable of reforming aldehydes, ketones or hydroxy fats, or other rancidity-producing substances. It has a melting point of less than 37½° C.

In producing the product described, I employ the process herein set forth as the one preferred by me, although not the essential or only one that may be employed for that purpose, since modifications within the spirit of my invention may occur to one skilled in the art.

In carrying out my invention, an ordinary standard autoclave, preferably equipped with a circulating injector is employed. Edible cocoanut fat, purified by standard methods known to the art and substantially neutralized to about two tenths per cent (0.2%) free fatty acids is placed within the autoclave in any suitable manner. The cocoanut fat is melted before placing it in the autoclave and enters the autoclave in liquid condition in an amount corresponding within the capacity of the autoclave. Instead of using the neutralized edible cocoanut fat just referred to, it is also possible to utilize a cheaper grade of edible cocoanut fat which has not been neutralized to the same extent as heretofore stated. The fat that is thus introduced into the autoclave is treated therein for a period of about two or three hours, and is subjected to hydrogenation under a pressure of between 250 (about) and 600 (about) pounds at a temperature under 120° C. Various alternative methods may be used in this connection, for instance, the pressure may be constant at 250 pounds and the temperature may be varied and advanced from 70° to a maximum of 120° C.

In other cases, the pressure may be maintained at 600 pounds and the temperature maintained constant at 70° to 80° C.

In this process the function of the high pressure is to carry out the process within a practical period of time, it being well-established law of hydrogenation that the rate of action of whatever hydrogenation takes place varies as the pressure or density of the hydrogen. The function of the temperatures at which the process is carried out is to differentiate between the incomplete vegetable fats, ketones and aldehydes, and the normal unsaturated vegetable fats. In the art of hydrogenation as heretofore employed, it has been well known that the rate of hydrogenation of such normal unsaturated fats as oleic glycerides is very slow at temperatures below 185° C., and is hardly appreciable at much lower temperatures. Temperatures as low as 120° C. have never been employed in the art for the purpose of hydrogenating normal unsaturated fats. But I have found that aldehydes, and rancidity- and odor-producing compounds, as carried with nearly all vegetable fats, are readily decomposed by hydrogen at very low temperatures, that is, between 70° C. and 120° C. I have also found that the valuable fat compounds of butter are incapable of withstanding temperatures as high as those used in the ordinary hydrogenation processes. This process is therefore designed to protect from destruction or hydrogenation those more delicate compounds which occur both in butter and in the vegetable fat to be treated. I have found that the use of a low temperature, such as a temperature below the destruction or hydrogenation point of such fat compounds will permit the destruction of the vegetable toxins and partially-formed vegetable fats without destruction or transformation of the more delicate butterlike compounds or normal unsaturated fats which it is desired to leave largely unaffected. I have found that the vegetable aldehydes, ketones and other rancidity-producing compounds are completely and instantly destroyed at 70° C., the period of time required for this reaction has been found by me to be a few seconds only. The reaction required for hydrogenizing the fat and sterilizing it may be carried out at 70° C. While the rancidity producing compounds, aldehydes and ketones are destroyed very quickly at 70° C. the transformation of the hydroxy fats does not take place so quickly and it is necessary to extend the time of hydrogenation somewhat in order to stabilize the fat against the reformation of rancidity compounds. In practice, it is frequently more convenient to use a temperature somewhat higher than 70° C. since the reactions are thus caused to take place more rapidly. At a low temperature, 70° C. for instance, the differentiation between the action of the hydrogen on the aldehydes and on the fats is very marked. If a portion of cocoanut oil is heated at 120° for a few minutes, it will develop aldehydes very distinctly, and give a plain color reaction for aldehydes. If this oil is then cooled to 70° C. and a portion of nickel catalyst freshly prepared and so containing a little absorbed hydrogen, is stirred into it, the aldehydes will be completely and instantly decomposed and the oil will give no further test for them. The oil will also have lost its rancid odor. But analysis of the oil before and after this experiment shows no change whatever in the oleic constituents. Also the incomplete or hydroxy fats are not found to be materially reduced, so that the oil will regenerate the various rancid compounds and reform aldehydes if again heated to 120° C. Then if this same oil is subjected to hydrogenation with a catalyst for a period of one hour under 300 pounds pressure at 90° C., it will be found to be deodorized and further will be found to be stable against heat so that again heating it to 120° C. will not regenerate aldehydes unless the heating be prolonged to, say, two hours. But this oil is free from hydroxy fats which are known to be one of the compounds capable of reproducing rancidity, and at the same time, the oleic glyceride is found unchanged to any measurable extent. The selective action of the hydrogen is thus a positive fact.

For the removal of the hydroxy fats so that rancidity cannot be reproduced appreciable time has been found necessary, but in so far as it is possible to determine experimentally, the destruction of the hydroxy fats or rancidity-causing compounds is complete before the hydrogenation of the normal unsaturated fats has proceeded to a measurable extent. When the temperature is kept below 120° C., the hydrogenation is continued until the incomplete fats are found to be fully transformed, which is determined practically by measuring the rate of decomposition of the fat at suitable temperatures. When the fat is found to be stable against heat, the incomplete fats are known to be destroyed or transformed. By the expression "incomplete fats" is meant fats such as hydroxy fats, fats which are not completely formed into normal fats. In these fats, for instance, hydroxy radical exists in place of a fatty acid radical and thus the molecule is not completely formed into a complete molecule. At this point the transformation of the normal unsaturated fats is not appreciable and the change in melting point and iodine number is small and may be attributed to the hydrogenation of the non-fat compounds or the incomplete or hydroxy fats. The change in iodine value and in melting point which is found to occur is due chiefly to the transformation of the non-fat vegetable compounds and the incomplete or hydroxy fats. At the temperature employed, transformation of normal or unsaturated fats is very slight and generally not appreciable, and these fats are substantially unhydrogenated. By thus selectively hydrogenating the constituent elements of the vegetable fat, the product becomes free from vegetable toxins and rancidity-producing compounds and stabilizes against re-formation of them.

My improved process differs from those heretofore used which have utilized higher temperatures, that is, above 120° C., and have used lower pressures, that is, below 250 pounds. Immediately after the hydrogenation process step above described as taking place in the autoclave, the oil is discharged from the autoclave through a filter so as to remove the catalyst. By this filtering the oil is somewhat cooled and immediately thereafter is further cooled to a temperature approximately 40° C. Such further cooling may be carried out by the use of a well-known jacketed kettle or other similar appliance. The cocoanut fat at this temperature is still liquid. By means of the low temperatures used in my process, the action of the hydrogen is intensified on the aldehydes, ketones and hydroxy fats so that the vegetable fat is detoxicated and purified from the various vegetable compounds, such as aldehydes, ketones and hydroxy fats. The action of the hydrogen, in the presence of the catalyst and by means of the low temperatures, brings about a chemical conversion of the aldehydes and ketones into alcohols or acids, as the case may be, and the conversion of the hydroxy fats into normal fats, which converted substances form part of the end product obtained, but instead of being toxic as they are in the form of aldehydes, ketones and hydroxy fats, are converted into non-toxic harmless compounds that are no longer objectionable. Further, the transformation of the hydroxy fats stabilizes the oil against further spontaneous decomposition into objectionable compounds, such as aldehydes and ketones and thereby prevents the re-formation of rancidity. The action of the hydrogen, on the other hand, is minimized, in so far as it acts upon the unsaturated or normal fats and therefore the normal fat is not hardened to any undesirable extent. As a result of this a fat is obtained which has a melting point below 37½° C. and that usually obtained has a melting point of 35° C., namely, about that of butter. This is accomplished by the action of the hydrogen reacting upon one constituent at one temperature and upon other constituents at other temperatures by which selective hydrogenation the constituents of the vegetable fat are independently hydrogenated at their proper temperatures. By selective hydrogenation is meant the action of the hydrogen at one temperature which reacts upon one constituent and then by increasing the temperature brings about the reaction of the hydrogen upon another constituent and by a further increase of temperature brings about the reaction of the hydrogen upon the other constituent, etc. By this method I select one constituent after the other and subject it to the action of hydrogen, and in my preferred form I select first the aldehydes and the ketones and hydrogenate these and then with the higher temperature select the hydroxy fats. This preferred form has the advantage that the hydroxy fats are not decomposed into aldehydes and ketones as they would be with a higher initial temperature. This preferred method has the advantages just stated that certain constituents, as the aldehydes and ketones, are first selected and hydrogenated and thereafter the hydroxy fats are selected and hydrogenated, but it is clear that my invention also comprehends a modified process in which a certain temperature sufficiently high to hydrogenate all the aldehydes, ketones and hydroxy fats may be initially applied and maintained. In this modified process there is also a selective hydrogenation in that, of the constituents of the vegetable fats, only certain constituents are hydrogenated and others are not at all affected by hydrogenation at that temperature. So, for instance, as a modified process, 120° C. could be applied as the initial temperature and for a given time which would be less than when advancing temperatures are used, and by the application of this temperature the aldehydes, ketones and hydroxy fats would be hydrogenated but the normal fats remain unhydrogenated and therefore undistrubed.

It will be noted that the product is hardened as little as possible to secure stability and that the product is incapable of re-forming toxic substances under ordinary storage or keeping conditions and is capable of withstanding sterilization or cooking processes without redeveloping rancidity. Such redevelopment of rancidity or the reformation of toxic substances would lower the assimilability and give odors or flavors. The tests applied in connection with the incapability of re-forming toxic substances are the usual feeding tests, such as the feeding of the particular food to some test animal such as a rat or guinea pig in place of other fats which would ordinarily be present in the diet of the animal. In addition the product answers favorably the test in respect to stability in that it is incapable of forming products, classed as rancidity constituents, when tested with phloroglucin or by similar tests for rancidity.

It will also be noted that the product consists of a cocoanut fat having a melting point lower than 37½° C., which is the body temperature, and as a result of this lower melting point, the advantages in the use of such a partially hydrogenated fat free from aldehydes, ketones and hydroxy fats is very great.

In the above-described method, I have more particularly referred to the use of an edible cocoanut fat that has been purified by standard methods and which has been neutralized substantially to about 0.2 to 0.25 of 1% free fatty acid contents, and have stated that a cheaper fat which has been less neutralized may be used. Heretofore in the refining of cocoanut fats it has been customary to take the higher melting point material for the purest fat. But by the use and employment of my process I can take a greater fraction and include in that fraction lower melting point fats and still obtain by my process a fat that is pure and stable and free from racidity. So, for instance, ordinary cocoanut fat has an iodine number not greater than 9, whereas, with my process, I can use a cocoanut fat of an iodine number up to 14 and then treat such fat as described and obtain a very satisfactory product as heretofore described.

By the use of the cheaper fat, as for instance, a larger fraction of the original oil, and treating that according to the process described, it is possible to produce highly purified non-toxic fractionally hydrogenated products even cheaper than the present acid-free untreated fat now sold as the edible fat.

It has been found that the use of catalyzers with a fat which is high in free fatty acid content tends to destroy the catalyzers and thus require regeneration, and it is for this purpose that I prefer to use a fat which is substantially free from free fatty acids so as not to require the regeneration of the catalyzers. These fats in the larger fraction can be obtained at a less cost because more of the original oil is utilized and ordinary methods of purification render them sufficiently free from free fatty acids.

I have described an embodiment of my process and a product of my invention, and have described it as applicable to cocoanut fat, but the process is applicable to any vegetable fat since the basic idea is the destruction or removal of certain vegetable compounds which occur associated with all vegetable fats. These compounds are destroyed and the hydrogenation carried out fractionally whether the vegetable fat be of fats of any vegetable origin. So palm oil or corn oil or peanut oil, now industrially important, may be treated in accordance with my process and satisfactory products obtained.

While the foregoing method is the one preferred by me in producing the product herein described, variations may be made in the method hereinbefore stated that would produce a product somewhat similar to this but would not be as desirable, as for instance, the temperature as specified may be varied somewhat and still get a product similar to that described. It is also possible to use temperatures somewhat higher than 120° C., but it is generally inadvisable. Thus if an oil containing a rather large proportion of oleic glyceride were used to start with, some of this oleic glyceride could be hydrogenated without bringing the melting point above 37.5° C. and so use of a temperature at which some oleic glyceride is transformed simultaneously with other compounds would not be impossible, but it would be more desirable to conduct the process on a purely selective basis as above outlined, so that the action on the different constituents could be controlled. So long as the oil is detoxicated and the hydrogenation of the normal fats does not proceed so far as to bring the melting point above 37.5° C., the process is permissible.

Having thus described my invention, I claim as new and desire to secure by Letters Patent:

1. The process of hydrogenating edible vegetable fats which consists in heating the fat to a temperature below the hydrogenation point of the normal unsaturated fat compounds, and then introducing hydrogen into the fat under pressure of approximately 250 to 600 pounds in the presence of a catalyst while maintaining said temperature to destroy the rancidity producing compounds of the fat.

2. The process of hydrogenating edible vegetable fats which consists in first subjecting the fat to a temperature of approximately 70° C. and introducing hydrogen in the presence of a catalyst to decompose the aldehydes, and then subjecting the fat to further hydrogenation while under pressure of approximately 250 to 600 pounds and at a temperature of 90° C. to decompose the hydroxy fats.

In testimony that he claims the foregoing as his invention, he has signed his name thereto.

GEORGE GRINDROD.